G. W. KRING.
CHECK-ROW ATTACHMENT FOR CORN-PLANTERS.
No. 173,650. Patented Feb. 15, 1876.
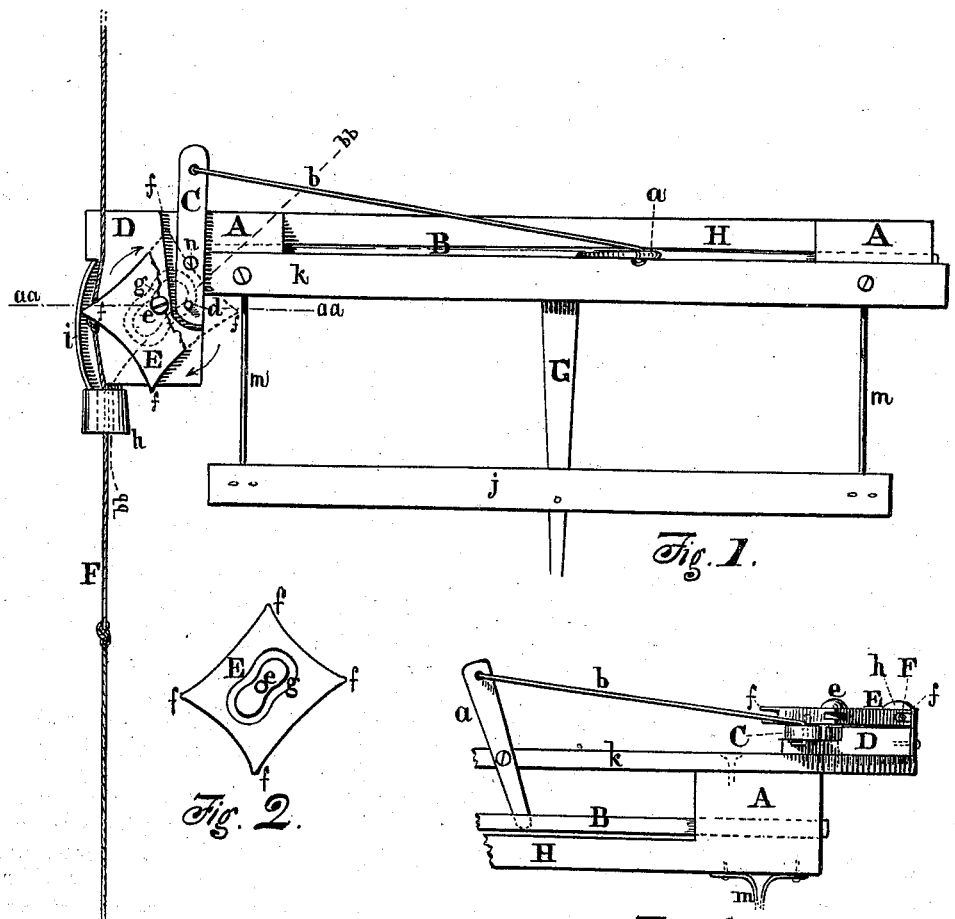
Fig. 1.
Fig. 2.
Fig. 3.
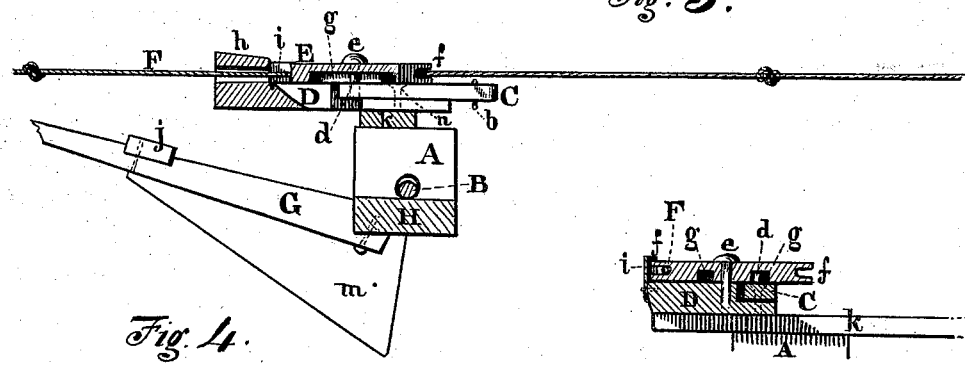
Fig. 4.
Irregular sec. on line bb fig 1
Thro' Guide h, & along cam-groove,
& seen from right of fig 2.
Fig. 5. (cross sec. on line aa aa fig. 1.)
Witnesses
Clarence Thurlow
Oloff Björnlow
Inventor
George W. Kring
by E. Thurlow, his atty in fact

UNITED STATES PATENT OFFICE.

GEORGE W. KRING, OF FAIRBURY, ILLINOIS.

IMPROVEMENT IN CHECK-ROW ATTACHMENTS FOR CORN-PLANTERS.

Specification forming part of Letters Patent No. 173,650, dated February 15, 1876; application filed December 5, 1874.

*To all whom it may concern:*

Be it known that I, GEORGE W. KRING, of Fairbury, in the County of Livingston and in the State of Illinois, have invented an Improvement in Check-Row Attachment to Corn-Planters; and do hereby declare that the following is a full, clear, and exact description thereof, reference being had to the annexed drawings, making a part of this specification, in which like letters of reference refer to like parts, and in which—

Figure 1 represents a plan view of cornplanter and check-row attachment in operation; Fig. 2, a view of the under side of the revolving plate E; Fig. 3, a rear elevation of check-row attachment; Fig. 4, a vertical section of same along dotted line $b\ b$, $b\ b$, Fig. 1, as to wheel and platform only; Fig. 5, a vertical cross-section on line $a\ a$, $a\ a$, Fig. 1.

This invention consists of a horizontal revolving cam-plate, having a notch at each corner to receive the knotted rope, and attached on one side of the machine, in combination with a guide and pivotal lever arranged to connect with the cut-off bar, the whole constructed and arranged to mark the rows for the corn, as will be hereinafter more fully explained.

In the drawings, A A represent the seedboxes; H, their lower connecting-bar, and $k$, the upper one, upon which this attachment is seated at the outer end. It consists of a horizontal platform, D, having a guide, $h$, on a level with the surface, perforated in a line parallel with the runners $m$ and with the cord F, for the passage of the latter through it with its knots, and a curved guard or wall, $i$, on its outer edge, to hold the cord within the notches of the arms $f$ of the wheel E. In a recess on said platform D is pivoted the short lever C, (at $n$,) having a short vertical pin, $d$, on the surface of its shorter arm, beneath the wheel E, and which works within the figure-8-shaped groove $g$ on the under side of said wheel. The wheel E is pivoted, at $e$, in a line with pin $d$, and the connecting-bar H $k$, and (besides said groove $g$) is provided with four or more arms, notched at the points $f$ to admit the rope F as the machine advances parallel therewith, the knots of which, striking the arms $f$, rotate said wheel E, which thus oscillates the lever C, rod $b$, lever $a$, and cut-off bar B of the seedboxes.

What I claim as my invention is—

The horizontal revolving cam-plate E, having notched corners $f$ to receive the knotted rope F attached to plate D on one side of the machine, in combination with the guide $h$, guard $i$, pivotal lever C, rod $b$, pivotal lever $a$, and seed-slide B, constructed and arranged to operate in the manner and for the purposes set forth.

In testimony that I claim the foregoing check-row attachment to corn-planters, I have hereunto set my hand this 24th day of November, A. D. 1874.

GEORGE W. KRING.

Witnesses:
C. P. CULTER,
G. H. KETTELLE.